United States Patent Office 3,443,919
Patented May 13, 1969

3,443,919
GASOLINE COMPOSITION CONTAINING ORGANO-1,1-DIHALOCYCLOPROPYLLEAD COMPOUND
Hymin Shapiro and Russell L. Hudson, Baton Rouge, La., assignors to Ethyl Corporation, New York, N.Y., a corporation of Virginia
No Drawing. Original application Feb. 23, 1965, Ser. No. 434,704, now Patent No. 3,382,265, dated May 7, 1968. Divided and this application Oct. 24, 1967, Ser. No. 684,093
Int. Cl. C10l 1/30, 1/20
U.S. Cl. 44—69            6 Claims

ABSTRACT OF THE DISCLOSURE

A hydrocarbon fuel composition containing an organolead compound having the formula

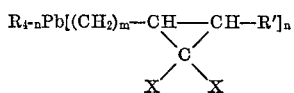

wherein R is an organic radical containing from 1 to about 5 carbon atoms, R′ is hydrogen, a halogen or an organic radical containing from 1 to about 3 carbon atoms, X is a halogen, $n$ is an integer from 1 to 4 and $m$ is an integer from 0 to 3.

---

This application is a division of application Ser. No. 434,704, filed Feb. 23, 1965, now U.S. 3,382,265.

It is known that when organometallic compounds such as tetraethyllead and tetramethyllead are employed as antiknock agents for internal combustion engine fuels means must be provided to remove the lead-containing products of combustion. At present the most widely known method of removing the lead products is to add to the fuel, in addition to the antiknock agent, certain organic halogen compounds and in particular organic chlorides and bromides. These organic halides react in the combustion chamber to form volatile lead halides which are removed from the combustion chamber during the exhaust cycle. This process has been called scavenging and material capable of so reacting is referred to as a lead scavenger, or more simply, as a scavenger.

Of the scavengers known heretofore, only ethylene dibromide and ethylene dichloride have been in successful commercial use for many years. Although they have generally met the requirements of good scavengers, they are not completely satisfactory for some conditions of operation of the present-day internal combustion engines, especially those engines which are used in heavy duty service. Over a period of years the desire for higher engine output has caused modifications in engine design which, for example, have caused a change in the distribution pattern of the antiknock and scavengers among the individual cylinders of engines at intake manifold pressures. It has been found that ethylene dibromide and ethylene dichloride are not completely satisfactory under some operating conditions in meeting the requirements imposed by those changes in engine design. This problem of the disproportionate volatilities of the antiknock agent and the scavengers has been recognized in the art and methods have been offered for its solution, for instance, in U.S. Patents 2,479,900; 2,479,901; 2,479,902; and 2,479,903.

It is an object of this invention to provide a novel composition of matter adaptable for use as an antiknock agent and fuels containing these compositions which do not incur this maldistribution problem. In other words, the compounds and fuel compositions of this invention will contain an alkyllead antiknock agent and at least the theoretical amount of halogen to scavenge all of the lead employed without incurring any problem at all with respect to disproportionate volatilities.

The objects of this invention are accomplished by the provision of novel organometallic compounds, and fuels containing these compounds, the compounds being described by the following formula

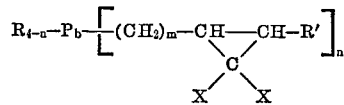

wherein R is an organic radical containing from 1 to about 5 carbon atoms, R′ is hydrogen, a halogen or an organic radical containing from 1 to about 3 carbon atoms, X is a halogen, $n$ is an integer from 1 to 4 and $m$ is an integer from 0 to 3.

The compositions of this invention are sometimes referred to as organo-1,1-dihalocyclopropyl lead compounds. The unique feature of this invention being the presence, in an organolead compound a radical having the following formula:

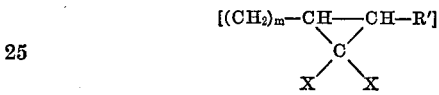

wherein R′, X and $m$ are defined as above. Thus, for instance, the term trimethyl-1,1-dichlorocyclopropyl lead refers to a compound having the following formula

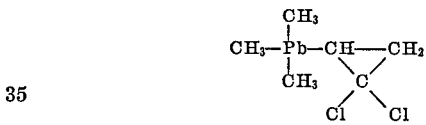

Likewise the terminology of triethyl-(methyl-1,1-dibromocyclopropyl)-lead refers to a compound having the structural formula

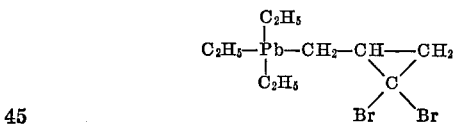

A compound referred to as divinyl-di(1,1-dichloro-3-methyl-cyclopropyl)-lead is the compound having the formula

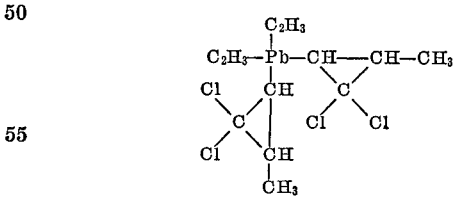

In the composition of this invention the halogen substituent, X, may be the same or they may be different. Chlorine and bromine are the highly preferred halogens. Compounds containing both chlorine and bromine on the cyclopropane ring are preferred embodiments of this invention. R is an organic radical having 1 to about 5 carbon atoms and is preferably an alkyl or an alkenyl radical. Preferably R contains from 1 to about 3 carbon atoms. These radicals may be the same or different, it being intended that mixed organoleads come within the scope of this invention. In the radical containing the 1,1-dihalocyclopropane ring it is preferable that $m$ be 0 and R′ be a hydrogen atom or a halogen atom.

A preferred embodiment of this invention is a compound described by the formula

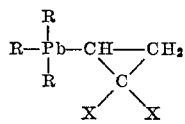

wherein R and X are as hereinabove defined.

In the engine fuel compositions of this invention this type of compound is added to the fuel in amounts corresponding to up to about 6 grams of lead per gallon of gasoline. The exact quantity added to any gasoline depends largely on the grade of gasoline desired.

The advantages incurred by this invention are:

(1) An antiknock compound containing at least one theory of halogen built into the molecule.

(2) The provision of an antiknock-scavenging composition in which no problem of disproportionate volatilities between the antiknock and the scavengers are incurred.

(3) That no separate blending of antiknock and scavenger is necessary.

(4) The halogens are bonded directly to carbon and thus the organic character of the compound is maintained as distinguished from the case where the lead atom is bonded directly to the halogen and behaves in many instances like an inorganic salt.

(5) The compounds are hydrolytically stable.

(6) The rate of decomposition of the scavenging moiety is closely related to the decomposition of the organolead compound and thus there will be a supply of hydrogen halide available for reaction with the lead compounds shortly after they have performed their function as antiknocks.

The compounds of this invention are synthesized by contacting ethylenic or acetylenic—tetraorganolean compounds having at least one multiple bond in an organo group with any suitable system which generates dihalocarbene. These systems may be a haloform such as chloroform, bromoform and the like or the trihalo acetates. These compounds are subjected to the action of materials such as sodium methoxide, potassium tertiary butoxide, and the like. In order that those skilled in the art may better understand the compounds and fuel compositions of this invention the following examples are given.

EXAMPLE I

This example is demonstrative of a method of preparing the organolead compounds of this invention.

5 parts by volume triethyl vinyl lead is charged to a reaction vessel containing 20 parts by weight sodium ethoxide. 40 parts by volume chloroform is added dropwise while stirring over a period of 2 hours. The reaction is allowed to continue for another hour. The reaction is conducted at approximately 100° C. and ambient pressure. The solids are separated by filtration. The product, triethyl-1,1-dichlorocyclopropyl lead, is recovered in good yield.

It is found that the above method is adaptable to the preparation of any and all of the organolead compositions of this invention. The necessary reagents are: A haloform such as bromoform, chloroform, dichlorobromoform, or a chlorodibromoform, a strong base such as an alkali metal alkoxide or hydroxide, and an organolead compound containing at least one unsaturated carbon-to-carbon bond.

The following examples demonstrate the formulation and use of the fuel compositions of this invention containing the organolead compounds herein described.

The base fuel used in these formulations is a hydrocarbon fuel boiling in the gasoline boiling range. These fuels have an ASTM (D–86) distillation with an initial boiling point of about 100° F. and a final boiling point of about 425° F. Preferably the unleaded base fuel has a Research octane number as determined by the accepted CFR engine test method of at least about 75. Also, the base fuel preferably contains at least 20 percent by volume of aromatic hydrocarbons and less than 30 percent by volume of olefinic hydrocarbons. The total paraffin and naphthene hydrocarbon content may be as much as 80 percent by volume. The more preferred hydrocarbon base fuels are also those which contain from 20 to 60 percent by volume aromatic hydrocarbons and from 0 to 30 percent by volume of olefinic hydrocarbons. Most preferably a gasoline having all-around desirable characteristics has a clear research octane number of at least 90 and contains about 50 to 60 percent by volume of paraffin and naphthene hydrocarbons, about 30 to 40 percent aromatic hydrocarbons and about 5 to 15 percent olefinic hydrocarbons.

The fuel compositions of this invention contain up to about 6 grams of lead per gallon of fuel and preferably from about 1.0 to about 5.0 grams of lead per gallon of fuel. Most preferably the compositions contain from about 2 to about 4 grams of lead per gallon of gasoline.

EXAMPLE II

A blend was prepared by adding triethyl-1,1-dichlorocyclopropyl lead (in the form of a 24.4 percent toluene solution) to a commercially available super-premium gasoline base stock containing approximately 35 volume percent of aromatics to form a mixture containing 3.17 grams of lead per gallon of gasoline. The leaded fuel of this invention was found to have a Research octane number of 102.1 and a Motor octane number of 92.3 as compared to the respective values on the unleaded base stock of 96.8 and 88.1. In these engine operations using the fuel of this invention, there was present in the combustion chamber one theory of chlorine based on the lead present therein.

EXAMPLE III

Blended to a concentration of 1.0 gram of lead per gallon is pentylethyl(propyl-3,1,1-dibromocyclopropyl)1-chloro-1-bromo-3-propyl cyclopropyl lead with a motor gasoline base stock containing by volume 40.2 percent of aromatics, 5.6 percent of olefins and 54.2 percent of saturates. This base fuel has a specific gravity of 53.4° API (according to ASTM Test Procedure D–287), a vapor pressure (according to ASTM Test Procedure D–323) of 8.0 p.s.i., and the following distillation characteristics (according to ASTM Test Procedure D–86): An initial boiling point of 100° F., a 10 percent point of 146° F., a mid-boiling point of 232° F., a 90 percent point of 331° F., and a final boiling point of 432° F. The finished fuel contains 1.5 theories of bromine and 0.5 theory of chlorine.

EXAMPLE IV

In this instance the gasoline base stock is composed by volume of 35.2 percent of aromatics, 25.0 percent of olefins and 39.8 percent of saturates. Its gravity is 55.2° API and its vapor pressure was 8.1 p.s.i. It has an initial boiling point of 236° F., a 90 percent point of 317° F., and a final boiling point of 392° F. Thimethyl-1-bromo-1-chlorocyclopropyl lead is blended with this base fuel to a concentration of 6.0 grams of lead per gallon. The resultant fuel contains 0.5 theory of bromine and 0.5 theory of chlorine.

EXAMPLE V

A motor fuel containing 5.0 grams of lead per gallon as dimethylethyle-1,1-dichlorocyclopropyl lead is prepared from a gasoline base stock composed by volume of 42.5 percent aromatics, 10.8 percent olefins and 46.7 percent saturates. This fuel has a gravity of 53.5° API, a vapor pressure of 7.9 p.s.i., an initial boiling point of 102° F., a 10 percent point of 152° F., a mid-boiling point of 235° F., a 90 percent point of 320° F., and a final boiling point of 399° F. This fuel thus contains 1 theory of chlorine.

EXAMPLE VI

The base fuel used in this instance contains 39.6 volume percent aromatics, 4.7 volume percent olefins and 55.7 volume percent saturates. The fuel has a gravity of 54.8° API and a vapor pressure of 8.4 p.s.i. Its distillation characteristics are an initial boiling point of 100° F., a 10 percent point of 139° F., a mid-boiling point of 225° F., a 90 percent point of 318° F., and a final boiling point of 420° F. Blended with this fuel is tetra-1,1-dichlorocyclopropyl lead in amount such that there were 2.0 grams of lead per gallon. The chlorine content is 4 theories.

EXAMPLE VII

Trimethyl - 1,1 - dibromocyclopropyl lead is admixed with a base fuel composed by volume of 36.0 percent aromatics, 7.3 percent olefins and 56.7 percent saturates. Other characteristics of this base fuel are: Gravity, 55.2° API; vapor pressure, 8.5 p.s.i.; initial boiling point of 95° F.; 10 percent point 137° F.; mid-boiling point of 228° F.; 90 percent point 327° F.; and a final boiling point of 426° F. On completion of the blending operation, the resultant fuel contains 4.0 grams of lead per gallon.

EXAMPLE VIII

Trimethyl-1,1-dichlorocyclopropyl lead is blended with a gasoline composed by volume of 37.5 percent aromatics, 5.1 percent olefins and 57.4 percent saturates. The base fuel has a gravity of 55.3° API, a vapor pressure of 8.3 p.s.i., an initial point of 97° F., a 50 percent point of 229° F., and a final boiling point of 432° F. The concentration of tetramethyllead is adjusted so that the fuel contains 3.2 grams of lead per gallon.

EXAMPLE IX

Trivinyl-1,1-dichlorocyclopropyl lead is blended with a gasoline composed by volume of 10 percent aromatics, 45 percent olefins and 45 percent saturates. The lead concentration is 3.18 grams per gallon.

Other organolead compounds utilized in the fuel compositions of this invention are: triethyl-1,1,3-trichlorocyclopropyl lead; divinylmethyl - 1,1-dibromocyclopropyl lead; tetra(2-ethyl - 1,1 - dichlorocyclopropyl)lead; methylethyldi(1,1 - dichloro-3-bromocyclopropyl)lead; dimethylethyl - 1,1 - dichlorocyclopropyl lead; tripropyl-1,1-dihalocyclopropyllead; dimethylvinyl - 1,1 - dihalocyclopropyllead and the like.

The fuel compositions of this invention may contain other components besides these self-scavenging organolead compounds. Such compounds may be solvents or diluents such as toluene or kerosene or other hydrocarbons. Dyes may also be present. Also, antioxidants such as alkylated phenols and amines, metal deactivators, phosphorous compounds, other antiknock agents such as tetraalkylleads, amines and metal carbonyls, antirust and antiicing agents, and wear inhibitors may be admixed with the compounds of this invention or added to fuels containing compounds of this invention.

The organolead compounds of this invention may be used in fuels without additional scavengers. However, if desired, other scavengers may be added therewith, such as ethylene dichloride and ethylene dibromide or mixtures thereof. The following is an example of such a composition.

EXAMPLE X

Trimethyl - 1,1 - dichlorocyclopropyl lead is blended with a gasoline containing 55 percent by volume saturates, 36 percent by volume aromatics and 11 percent by volume unsaturates so as to give a lead concentration of 3.18 grams per gallon of fuel. Together with the lead compound 0.50 theory of ethylene dichloride and 0.50 theory of ethylene dibromide are added to the fuel.

The foregoing example is repeated in all details except that 1.00 gram of the total lead content is present in the form of tetraethyllead and 2.18 grams is in the form of trimethyl - 1,1-dichlorocyclopropyl lead. The amount of added ethylene dichloride and ethylene dibromide may accordingly be correspondingly increased, if desired.

What we claim as new and desire to secure by Letters Patent of the United States is as follows:

1. A composition comprising a hydrocarbon fuel boiling in the gasoline boiling range containing in solution up to 6 grams of lead per gallon of gasoline in the form of an organolead compound having the following formula

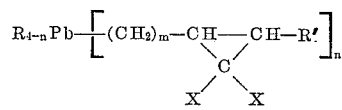

wherein R is an organic radical containing from 1 to about 5 carbon atoms, and R' is an organic radical containing from 1 to about 3 carbon atoms, X is a halogen, $n$ is an integer from 1 to 4 and $m$ is an integer from 0 to 3.

2. The composition of claim 1 wherein said organolead compound is trimethyl-1,1-dihalocyclopropyllead.

3. The composition of claim 1 wherein said organolead compound is trivinyl-1,1-dihalocyclopropyllead.

4. The composition of claim 1 wherein said organolead compound is triethyl-1,1-dihalocyclopropyllead.

5. The composition of claim 1 wherein said lead compound is tripropyl-1,1-dihalocyclopropyllead.

6. The composition of claim 1 wherein said lead compound is dimethylvinyl-1,1-dihalocyclopropyllead.

References Cited

UNITED STATES PATENTS

| | | | |
|---|---|---|---|
| 1,592,954 | 7/1926 | Midgley | 44—69 |
| 2,375,236 | 5/1945 | Miller | 252—386 XR |
| 2,447,926 | 8/1948 | Wiczer | 44—69 |
| 2,849,303 | 8/1958 | Lyben | 44—69 |
| 3,071,607 | 1/1963 | Juenge | 44—69 |
| 3,090,797 | 5/1963 | Freedman | 252—386 XR |

DANIEL E. WYMAN, *Primary Examiner.*

W. J. SHINE, *Assistant Examiner.*

U.S. Cl. X.R.

252—386